March 18, 1969  E. W. PITTARD  3,433,205
AUTOMATIC POULTRY FEEDING DEVICE WITH WATER SPRAYED FEED MIX
Filed Feb. 27, 1967
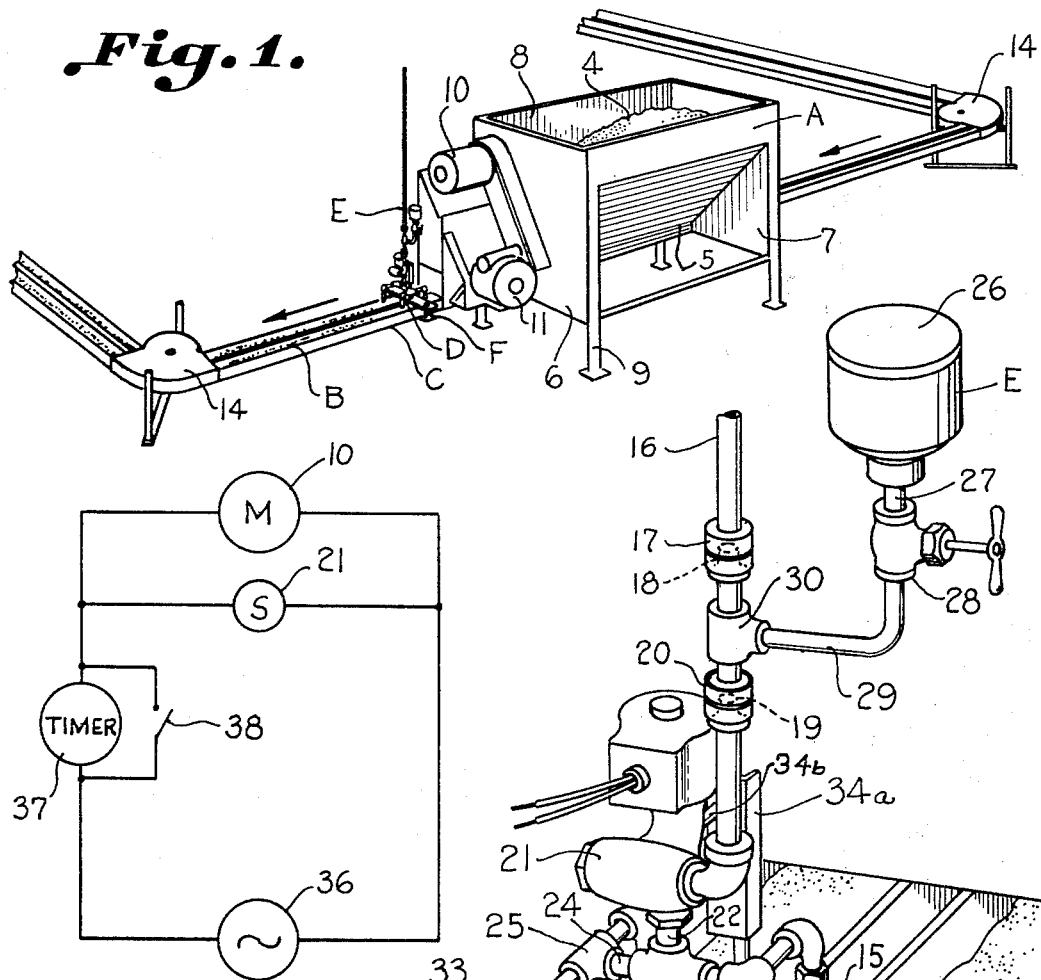
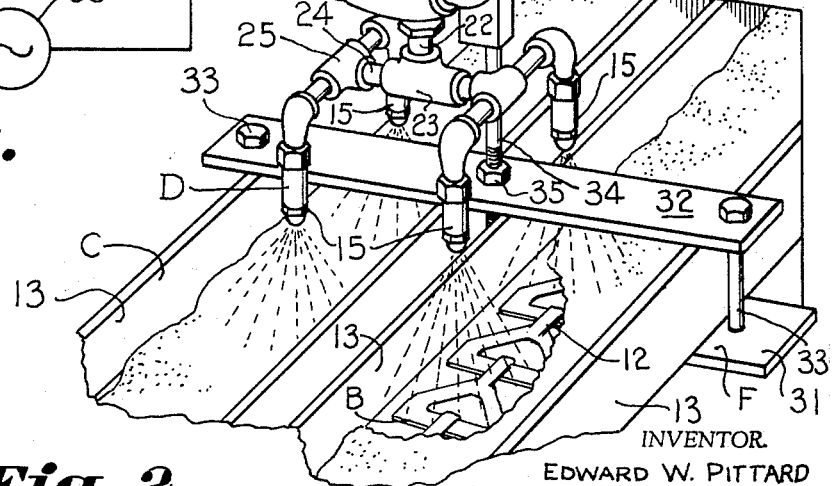
INVENTOR.
EDWARD W. PITTARD
BY Bailey + Dority
ATTORNEYS.

United States Patent Office 3,433,205
Patented Mar. 18, 1969

3,433,205
AUTOMATIC POULTRY FEEDING DEVICE WITH WATER SPRAYED FEED MIX
Edward W. Pittard, Box 157, Winterville, Ga. 30683
Filed Feb. 27, 1967, Ser. No. 618,760
U.S. Cl. 119—51.11        5 Claims
Int. Cl. A01k 39/00

ABSTRACT OF THE DISCLOSURE

An automatic feeding device for poultry which incorporates a hopper which automatically delivers poultry feed to a conveyor at regulated intervals. The conveyor transports the feed under a high pressure water sprayer which manipulates the feed passing thereunder, to provide a uniform mixture of feed and water. The sprayer is supported by an adjustable bracket for properly positioning longitudinally spaced sprayers. A quick connection is provided in a high pressure line connected to the sprayer for mixing a medicant with the water, and in turn, the poultry feed prior to feeding such to the poultry.

---

This invention relates to an automatic feeding device for poultry, and more particularly to an automatic feeding device which supplies a substantially uniform mixture of water and poultry feed which may be impregnated with a medicant to poultry.

Especially in recent years, the raising of poultry on a large scale has become a very scientific and competitive business. In order to compete it is necessary that the poultry, especially broilers, be raised and fattened in the shortest time possible. From previous studies and tests it has been found that if the feeding habits of the broilers are closely regulated so that a predetermined amount of feed can be supplied to the broilers at particular times, then the pounds of chicken gained relative to the pounds of feed fed thereto, can be maintained at a maximum. It has also been found that at particular times during a broiler's life, if the broiler is enticed to consume more feed than it normally would consume at that time, such aids in increasing the feed conversion rate; that is, the pounds of broiler gained relative to the pounds of feed fed to the broiler. One method of enticing the broilers to consume more feed than they normally would is by uniformly mixing the dry poultry feed with water.

It is important that the process of raising poultry be automated to the maximum so as to minimize the cost of labor. Thus, in addition to automatically feeding the poultry a mixture of water and poultry feed, it is also desirable to impregnate the feed with a medicant at frequent intervals. Poultry are extremely susceptible to certain diseases, such as gumboro, hemorrhagic syndrom, etc., and it is extremely important that a medicant be administered to the poultry in order to control such diseases.

The subject invention provides an automatic feeding device for supplying a substantially uniform mixture of water and poultry feed impregnated with medicant to poultry. The dried poultry feed is transported on a conveyor past a high pressure sprayer which manipulates the feed in order to produce a uniform mixture of water and feed. The high pressure line for the sprayer has connections for receiving a medicant dispenser so that medicant can be added to the water before such is sprayed onto the feed. The sprayer is supported on a bracket which allows longitudinally spaced nozzles to be adjusted to the desired height so that the spray can properly manipulate the dry feed passing thereunder.

Accordingly, it is an important object of this invention to provide an automatic poultry feeding device which supplies a substantially uniform mixture of water and poultry feed to poultry.

Another important object of the present invention is to provide an automatic poultry feeder which is entirely automatic in dispensing the feed and water to a flock of poultry, and yet is free from complicated electrical and mechanical devices with which the average poultry farmer is unfamiliar.

Still another important object of the present invention is to provide an automatic poultry feeding device which supplies a uniform mixture of water and poultry feed at regulated intervals with a medicant to a flock of poultry.

A further important object of the present invention is to provide an automatic feeding device which entices poultry to eat solid feed so as to produce a desirable conversion ratio between pounds of feed fed and pounds of poultry produced.

The construction designed to carry out the invention will be hereinafter described, together with other features thereof.

The invention will be more readily understood from a reading of the following specification and by reference to the accompanying drawing forming a part thereof, wherein an example of the invention is shown and wherein:

FIGURE 1 is a perspective view of a poultry feed dispensing hopper and a conveyor provided with a spraying mechanism carried thereon, FIGURE 2 is an enlarged perspective view of the sprayer mechanism supported by a bracket on the conveyor, and FIGURE 3 is a diagrammatic sketch of the wiring circuit employed in this invention for automatically coordinating the operation of the sprayer and the motor associated with the feed dispensing hopper.

The drawing illustrates an automatic feeding device which supplies a substantially uniform mixture of water and poultry feed impregnated with medicant to a flock of poultry.

A poultry feed dispensing hopper A is provided to accommodate a supply of poultry feed. A substantially horizontal conveyor B passes adjacent the hopper and conveys the feed from the hopper. The conveyor is carried within a trough which confines the feed so that such be transported along a predetermined path. Carried on the trough is a high pressure water sprayer which manipulates the feed passing thereunder to provide a uniform mixture of feed and water. A high pressure water line is connected to said sprayer for supplying water to said sprayer. In order to selectively permit the passage of water through the line a valve is interposed therein. Means is provided for activating the valve and the conveyor B for controlling the feeding of the poultry. A quick connection is provided in the line for interposing a liquid medicant dispenser E in the line. A valve means is coupled to the medicant dispenser E for regulating the flow of medicant into the high pressure line to be mixed with the water and sprayed on the poultry feed. The sprayer is supported in a spaced longitudinal relation with the feed dispensing hopper by a bracket F carried on the trough C. Thus, a mixture of feed and water impregnated with medicant is automatically supplied for feeding the poultry at regulated intervals.

The poultry feed dispensing hopper A is filled from the top with dry poultry feed 4, which tends to flow down the inclined wall 5 through an elongated opening in the bottom of the hopper. The inclined wall 5 is joined by opposed side walls 6 and 7, respectively, and a rear wall 8 joins the two side walls 6 and 7 to define the hopper. The hopper is suitably supported off the floor by the vertical legs 9.

The conveyor B extends through the hopper directly below the elongated slot which is not shown, and is propelled by a suitably mounted motor 10. The motor 10 has a belt secured to its drive shaft which rotates a reduction gear 11. The output shaft of the reduction gear (not shown) has a sprocket mounted thereon, which engages teeth 12 of the conveyor B for propelling such.

The trough C carries the conveyor B and confines the feed so that the feed can be transported along a predetermined path by the conveyor. In the particular embodiment illustrated there are two parallel troughs C, each of which has a conveyor running therethrough. The troughs are U-shaped having a flat bottom and integral vertical side walls 13. Conventional cornering devices 14 are provided for changing the direction of travel of the conveyor chain. One suitable feed dispenser and conveying mechanism is manufactured by the Automatic Poultry Feeder Company of Zeeland, Mich., and has a Model No. 10-30-500 and 10-35-500.

The high pressure water sprayer D is carried on the troughs for manipulating the feed passing thereunder to provide a uniform mixture of feed and water. The sprayer includes a pair of longitudinally spaced nozzles 15 positioned above each trough. The feed which passes under the first nozzle is mixed with the fluid being sprayed thereon, and is also manpulated by the high pressure of the spray. The second nozzle 15, which is longitudinally spaced from the first nozzle, completes the dampening operation and insures that the feed and water is substantially uniformly mixed. The dry feed is manipulated by both the spray from the nozzles 15 and the conveyor chain causing substantially all of the feed to be exposed to the water spray. Water is supplied to the nozzles through a high pressure water line 16 which is connected to any suitable pressurized domestic source of water. The water line 16 has a female fitting 17 of a quick connection which receives a male fitting 18 or a male fitting 19. When the liquid medicant dispenser E is interposed in the line the male fitting 18 of the quick connection is coupled to the female fitting 17 and a female fitting 20 of the lijuid medicant dispenser is coupled to the male fitting 19 in the line 16. When the liquid medicant is not being used the male fitting 19 is connected to the female fitting 17 in the line. Water passes through the line 16 into a solenoid valve 21 which is selectively energized for controlling the passage of water through the line. The output of the valve 21 is coupled through a nipple 22 to a T-joint 23. One side of the T-joint 23 is coupled through a nipple 24 to another T-joint 25, which in turn, supplies the water to the pair of nozzles 15. Water is supplied through similar connections to the nozzles 15 positioned over the other trough. The liquid medicant dispenser E includes a receptacle 26 into which the medicant is placed. The medicant flows out the bottom of the receptacle through a conduit 27 and adjustable valve 28, through a conduit 29 into a T-joint 30 interposed in the high pressure line 16.

As previously mentioned, the liquid medicant dispenser can be readily inserted within the line 16 by means of the quick connectors. The valve means 28 coupled to the input of medicant dispenser regulates the flow of medicant into the high pressure line for mixing with the water that is being sprayed on the poultry feed. It is highly desirable to mix the medicant with the moist food, since frequently chickens will eat moist food when they are sick, even though they will not eat dry poultry feed. The spraying of the water on the feed to produce a substantially uniform mixture aids tremendously, especially in the last stage of development, in putting weight on chickens and the like.

The sprayer D is supported by a bracket F. The bracket F includes a pair of vertically disposed horizontal bars 31 and 32, respectively. The bar 31 is positioned below the troughs, and is connected by means of a pair of bolts 33 to the bar 32 carried above the troughs C. When the bolts 33 are tightened down, the bracket is securely fixed to the troughs. A threaded vertical standard or bolt 34 extends upwardly through a pair of aligned closely fitting holes in the bars 31 and 32. A plate 34a is welded to the top of the standard and has laterally extending bars 34b integral therewith, which are in turn welded to the solenoid valve 21 for supporting the sprayer.

The height of the sprayer can be varied by rotating a threaded nut 35 carried on the vertical standard 34. Another nut (not shown) is carried on the vertical standard below the horizontal bar 31 for securely fixing the standard relative to the bars when such is drawn tight against the bottom surface of the bar 31.

The solenoid valve 21 and the motor 10 are energized from any suitable source of power, such as illustrated at 36 through a suitable clock-timing mechanism 37. By setting the timer, the motor 10 and solenoid valve 21 can be energized at any desired regulated interval. A manual switch 38 is connected in shunt with the timer so that the feeding operation can be commenced by closing such.

Normally, the feed dispensing hopper A is located in a room isolated from the chicken coop so that the chickens cannot eat the feed therefrom. The conveyor conveys the feed into the chicken coop at the desired feeding times.

While a preferred embodiment of the invention has been described using specific terms, such description is for illustrative purposes only, and it is to be understood that changes and variations may be made.

What is claimed is:

1. An automatic feeding device for supplying a substantially uniform mixture of water and poultry feed impregnated with medicant to poultry comprising: a poultry feed dispensing hopper provided to accommodate a supply of poultry feed; a substantially horizontal conveyor passing adjacent said hopper conveying feed from said hopper; an animal feed trough carrying said conveyor and confining said feed so that said feed can be transported along a predetermined path by said conveyor; a high pressure water sprayer carried on said trough and directed into trough for manipulating said feed passing thereunder to provide a uniform mixture of feed and water; a high pressure water line connected to said sprayer for supplying water thereto; a valve interposed in said line for selectively permitting the passage of water through said line; a liquid medicant dispenser; a connection in said line for interposing said medicant dispenser in said line; and a valve means coupled to said medicant dispenser for regulating the flow of medicant into said high pressure line to be mixed with said water and sprayed on said poultry feed, whereby a mixture of feed and water impregnated with medicant is supplied for feeding poultry.

2. An automatic feeding device for supplying a substantially uniform mixture of water and poultry feed to poultry comprising: a poultry feed dispensing hopper provided to accommodate a supply of poultry feed; a conveyor passing adjacent said hopper conveying feed from said hopper; an animal feed trough carrying said conveyor and confining said feed so that said feed can be transported along a predetermined path by said conveyor; a high pressure water sprayer carried on said trough and directed into the trough for manipulating said feed passing thereunder to provide a uniform mixture of feed and water; a high pressure water line connected to said sprayer for supplying water thereto; a valve interposed in said line for selectively permitting the passage of water through said line; means for activating said valve at regulated intervals; and a bracket carried on said trough for supporting said sprayer in a spaced longitudinal relation with said feed dispensing hopper, whereby a uniform mixture of feed and water is automatically supplied to poultry at regulated intervals.

3. The feeding device as set forth in claim 2, wherein a threaded standard is supported by said bracket and said sprayer is attached thereto; and a threaded nut is carried on said standard in engagement with said bracket for adjusting the position of said sprayer upon rotation relative to said trough.

4. The device as set forth in claim 3 comprising: a liquid medicant dispenser; and a connection in said line for interposing said medicant dispenser in said line, whereby a mixture of feed and water impregnated with medicant is automatically supplied to poultry at regulated intervals.

5. The device as set forth in claim 4, wherein said sprayer includes a plurality of longitudinally spaced nozzles.

References Cited

UNITED STATES PATENTS

| | | | |
|---|---|---|---|
| 1,967,022 | 7/1934 | Chandler | 119—51.5 |
| 3,150,639 | 9/1964 | Sereda | 119—78 |
| 3,191,581 | 6/1965 | Braham | 119—52 |
| 3,196,835 | 7/1965 | Bergevin | 119—51.5 X |
| 3,265,036 | 8/1966 | Kloss | 119—51.5 X |
| 3,292,584 | 12/1966 | Brodrick | 119—51 |
| 3,295,500 | 1/1967 | Blough | 119—51.5 |
| 3,339,529 | 9/1967 | Holste et al. | 119—51.5 |

ALDRICH F. MEDBERY, *Primary Examiner.*

U.S. Cl. X.R.

119—51.5, 52